(12) United States Patent
Danala et al.

(10) Patent No.: US 11,734,893 B2
(45) Date of Patent: Aug. 22, 2023

(54) CURATING VIRTUAL TOURS

(71) Applicant: Sony Interactive Entertainment LLC, San Mateo, CA (US)

(72) Inventors: Punitha Danala, San Mateo, CA (US); Sarah Karp, San Mateo, CA (US)

(73) Assignee: SONY INTERACTIVE ENTERTAINMENT LLC, San Mateo, CA (US)

( * ) Notice: Subject to any disclaimer, the term of this patent is extended or adjusted under 35 U.S.C. 154(b) by 0 days.

(21) Appl. No.: 17/404,426

(22) Filed: Aug. 17, 2021

(65) Prior Publication Data
US 2023/0055749 A1    Feb. 23, 2023

(51) Int. Cl.
*A63F 13/52*    (2014.01)
*A63F 13/65*    (2014.01)
*G06T 19/00*    (2011.01)

(52) U.S. Cl.
CPC ............ *G06T 19/003* (2013.01); *A63F 13/52* (2014.09); *A63F 13/65* (2014.09); *A63F 2300/69* (2013.01)

(58) Field of Classification Search
CPC ........ G06T 19/003; A63F 13/52; A63F 13/65; A63F 2300/69
See application file for complete search history.

(56) References Cited

U.S. PATENT DOCUMENTS

| | | | |
|---|---|---|---|
| 5,377,997 A | 1/1995 | Wilden et al. | |
| 8,624,902 B2* | 1/2014 | Chen | G06T 17/05 345/473 |
| 10,369,472 B1 | 8/2019 | Mattar et al. | |
| 2009/0276718 A1* | 11/2009 | Dawson | A63F 13/55 707/999.009 |
| 2014/0089850 A1* | 3/2014 | Gorstan | G06F 3/0482 715/810 |
| 2015/0153160 A1* | 6/2015 | James | G01C 21/206 356/614 |
| 2016/0260252 A1* | 9/2016 | Kim | G06F 3/017 |
| 2016/0260253 A1* | 9/2016 | Reddy | G06T 15/205 |

(Continued)

FOREIGN PATENT DOCUMENTS

WO    WO 2016/144279    9/2016

OTHER PUBLICATIONS

European Application No. 22187036.3, Extended European Search Report dated Jan. 5, 2023.

(Continued)

*Primary Examiner* — Jitesh Patel
(74) *Attorney, Agent, or Firm* — Polsinelli LLP

(57) ABSTRACT

Systems and methods for creating a customizable curated tour of three-dimensional virtual environments. Curation inputs may include selecting a virtual environment and selecting an ordered set of various locations within the virtual environment. A curated tour may be launched such that designated avatars may be placed to a first selected location of the ordered set and receive a subset of information about the first selected location. The subset of information may include user-generated content regarding the first selected location. The selected three-dimensional virtual environment may correspond to an in-game environment of an interactive content title, and specifically about one or more in-game activities in which one or more other users participated in at the first selected location.

20 Claims, 7 Drawing Sheets

(56) References Cited

U.S. PATENT DOCUMENTS

| | | | |
|---|---|---|---|
| 2018/0143023 A1* | 5/2018 | Bjorke | G06T 19/003 |
| 2018/0232921 A1* | 8/2018 | Smith | G06Q 30/0201 |
| 2019/0005717 A1* | 1/2019 | Singh | G06T 15/80 |
| 2019/0026944 A1* | 1/2019 | Laaksonen | G06F 3/013 |
| 2019/0099675 A1 | 4/2019 | Khan et al. | |
| 2019/0104235 A1* | 4/2019 | Sarkar | A63F 13/213 |
| 2019/0033285 A1 | 10/2019 | Delia et al. | |
| 2020/0133618 A1* | 4/2020 | Kim | G06F 3/147 |
| 2020/0188792 A1 | 6/2020 | Stephens et al. | |
| 2021/0029393 A1 | 1/2021 | Bermeister | |

OTHER PUBLICATIONS

European Application No. 22183609.1, Extended European Search Report dated Jan. 2, 2023.

\* cited by examiner

CURATING VIRTUAL TOURS

BACKGROUND OF THE INVENTION

1. Field of the Invention

The present technology pertains to providing curated virtual tours. More specifically, the present technology may provide curated virtual tours in three-dimensional virtual environments associated with interactive content titles.

2. Description of the Related Art

Virtual environments may include replicas of real-world environments at various points in history to present day or fantasy worlds (e.g., in-game virtual environments), as well as digital environment associated with other media sources (e.g., movies, television) and applications. Different virtual environments may be of different interest to individuals who are enthusiasts of certain games, movies, travel, history, arts, etc.

While gaming and other media platforms may offer involve engagement with such virtual environments, such engagement may generally be limited to virtual environments associated with gameplay of a game title. Such gameplay may further include a number of challenges requiring the attention of the user, who may not otherwise have sufficient time or attention to devote to enjoying or experiencing the virtual environment. In such instances, interacting with elements (e.g., competing in a race, fighting competitors) within the virtual environment may actually prevent the user from fully appreciating the details of the virtual environment, including audio-visual, technical, historical, or artistic details, etc.

In addition, gameplay of certain game titles may prevent groups from visiting different virtual environments together, as different users may be virtually picked off or otherwise terminated at various points during the gameplay session as a result of their respective gameplay (e.g., due to losing a race, being shot during a gunfight, losing a martial arts contest). Thus, it may be difficult for a user to visit multiple game environments with another user in the same game title, let alone a series of game environments across multiple different game titles, media content titles, and other virtual applications.

Therefore, there is a need in the art for improved systems and methods of creating tailored and customizable curated tours of three-dimensional virtual environments.

SUMMARY OF THE CLAIMED INVENTION

Disclosed are systems, apparatuses, methods, computer readable medium, and circuits for providing curated virtual tours in three-dimensional (three-dimensional) virtual environments. According to at least one example, a method includes: storing a plurality of datasets, each dataset corresponding to a different three-dimensional virtual environment; receiving a curation input over a communication network from a curator device associated with a curator, the received curation input including a selected one of the three-dimensional virtual environments and an ordered set of one or more selected locations within the selected three-dimensional environment; launching a curated tour in response to a trigger based on the received curation input, wherein launching the curated tour includes placing one or more designated avatars at a first selected location within the ordered set of the selected three-dimensional virtual environment, wherein a subset of the dataset corresponding to the selected three-dimensional virtual environment is presented at the first selected location; automatically relocating the designated avatars to a next selected location with the ordered set of the selected three-dimensional virtual environment in response to a next trigger.

For example, the virtual tour curation server stores a plurality of datasets, each dataset corresponding to a different three-dimensional virtual environment; receives a curation input over a communication network from a curator device associated with a curator, the received curation input including a selected one of the three-dimensional virtual environments and an ordered set of one or more selected locations within the selected three-dimensional environment; launches a curated tour in response to a trigger based on the received curation input, wherein launching the curated tour includes placing one or more designated avatars at a first selected location within the ordered set of the selected three-dimensional virtual environment, wherein a subset of the dataset corresponding to the selected three-dimensional virtual environment is presented at the first selected location; automatically relocates the designated avatars to a next selected location with the ordered set of the selected three-dimensional virtual environment in response to a next trigger.

In another example, a virtual tour curation server for providing curated virtual tours in three-dimensional (three-dimensional) virtual environments is provided that includes a storage (e.g., a memory configured to store data, such as virtual content data, one or more images, etc.) and one or more processors (e.g., implemented in circuitry) coupled to the memory and configured to execute instructions and, in conjunction with various components (e.g., a network interface, a display, an output device, etc.), cause the virtual tour curation server to: store a plurality of datasets, each dataset corresponding to a different three-dimensional virtual environment; receive a curation input over a communication network from a curator device associated with a curator, the received curation input including a selected one of the three-dimensional virtual environments and an ordered set of one or more selected locations within the selected three-dimensional environment; launch a curated tour in response to a trigger based on the received curation input, wherein launching the curated tour includes placing one or more designated avatars at a first selected location within the ordered set of the selected three-dimensional virtual environment, wherein a subset of the dataset corresponding to the selected three-dimensional virtual environment is presented at the first selected location; automatically relocate the designated avatars to a next selected location with the ordered set of the selected three-dimensional virtual environment in response to a next trigger.

DETAILED DESCRIPTION

Aspects of the present disclosure include systems and methods for creating a customizable curated tour of three-dimensional virtual environments. Curation inputs may include selecting a virtual environment and selecting an ordered set of various locations within the virtual environment. A curated tour may be launched such that designated avatars may be placed to a first selected location of the ordered set and receive a subset of information about the first selected location. Locations of the one or more designated avatars may further be monitored such that if there is a feature discovery mode, an option to present the subset of information to the avatars may be provided based on a predetermine proximity to the first selected location. The subset of information may include user-generated content regarding the first selected location. The selected three-dimensional virtual environment may correspond to an in-game environment of an interactive content title, and specifically about one or more in-game activities in which one or more other users participated in at the first selected location. The selected may correspond to a real-world location and further may be correspond to the real-world location throughout a plurality of different time periods. Users associated with the designated avatars may also be given an option to play a game together, such as one associated with the first selected location.

Figure 1:
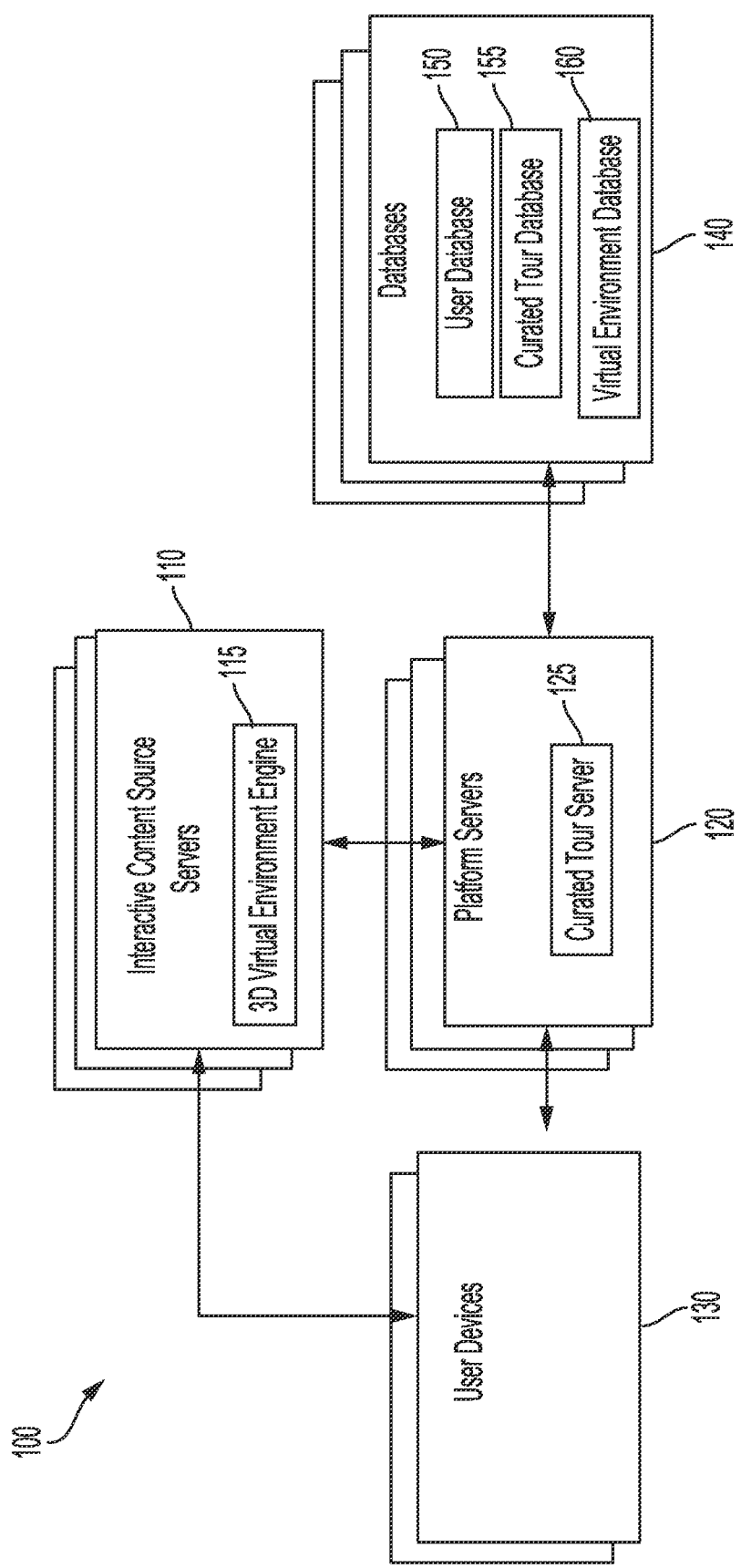
FIG. 1 illustrates an exemplary network environment in which a system for creating a customizable curated tour of three-dimensional virtual environments may be implemented.

FIG. 1 illustrates an exemplary network environment 100 in which a system for creating a customizable curated tour of three-dimensional virtual environments may be implemented. The network environment 100 may include one or more interactive content source servers 110 that provide streaming content (e.g., interactive content titles, game titles, interactive video, podcasts, etc.), one or more platform servers 120, one or more user devices 130, and one or more databases 140.

Interactive content source servers 110 (inclusive of game servers) may maintain, stream, and host interactive media available to stream on a user device 130 over a communication network. Such interactive content source servers 110 may be implemented in the cloud (e.g., one or more cloud servers). Each media may include one or more sets of object data that may be available for participation with (e.g., viewing or interacting with an activity) by a user. Data about the object shown in the media may be stored by the interactive content servers 110, platform servers 120 and/or the user device 130, in an object file ("object file"), as will be discussed in detail with respect to FIGS. 3A and 3B.

The interactive content source servers 110 may include a three-dimensional virtual environment engine 115 that creates an associated three-dimensional virtual environment based on datasets associated a location of an avatar placed into the associated three-dimensional virtual environment. The interactive content source servers 110 may generate, using the three-dimensional virtual environment engine 115, the associated three-dimensional virtual environment for a curated tour based on datasets associated with locations in the associated three-dimensional virtual environment.

The platform servers 120 may be responsible for communicating with the different interactive content source servers 110, databases 140, and user devices 130. Such platform servers 120 may be implemented on one or more cloud servers. The platform servers 120 may include a curated tour server 125 operating in conjunction a curated tour database 155 and the three-dimensional virtual environment engine 115 to provide a curated tour in the associated three-dimensional virtual environment.

In an exemplary embodiment, the curated tour server 125 may query a curator database 210 of or associated to a user database 150 for datasets associated with a curated tour of an associated three-dimensional virtual environment. The datasets may be associated with launching a curated tour in the associated three-dimensional virtual environment, such as one or more datasets associated with selected locations within the associated three-dimensional virtual environment. The curated tour server 125 may configure the associated three-dimensional virtual environment itself using an internal three-dimensional virtual environment engine 205 (see FIG. 2) based on stored datasets associated with the associated three-dimensional virtual environment or query a three-dimensional virtual environment engine 115 associated with a particular interactive source content server 110.

In another example, if the three-dimensional virtual environment is associated with a real-world location, and the virtual environment database 160 includes three-dimensional rendering information regarding the real-world location, the curated tour server 125 may launch the curated tour without querying an interactive source content server 110. As another example, if the three-dimensional virtual environment is associated with an in-game environment, the curated tour server 125 may query an associated three-dimensional virtual environment engine 115 of an associated interactive source content server 110 to generate and launch the curated tour of the associated three-dimensional in-game virtual environment. For either of these examples, the virtual environment database 160 may store datapoints associated with locations that may be part of a curated tour that may be customized into an ordered set of a curated tour.

The interactive content source servers 110 may communicate with multiple platform servers 120, though the interactive content source servers 110 may be implemented on one or more platform servers 120. The platform servers 120 may also carry out instructions, for example, receiving a user request from a user to stream streaming media (i.e., games, activities, video, podcasts, User Generated Content ("UGC"), publisher content, etc.). The platform servers 120 may further carry out instructions, for example, for streaming the streaming media content titles. Such streaming media may have at least one object set associated with at least a portion of the streaming media. Each set of object data may have data about an object (e.g., activity information, zone information, actor information, mechanic information, game media information, etc.) displayed during at least a portion of the streaming media.

The streaming media and the associated at least one set of object data may be provided through an application programming interface (API), which allows various types of interactive content source servers 110 to communicate with different platform servers 120 and different user devices 130. API may be specific to the particular computer programming language, operating system, protocols, etc., of the interactive content source servers 110 providing the streaming media content titles, the platform servers 120 providing the media and the associated at least one set of object data, and user devices 130 receiving the same. In a network environment 100 that includes multiple different types of interactive content source servers 110 (or platform servers 120 or user devices 130), there may likewise be a corresponding number of APIs.

The user device 130 may include a plurality of different types of computing devices. For example, the user device 130 may include any number of different gaming consoles, mobile devices, laptops, and desktops. Such user device 130 may also be configured to access data from other storage media, such as, but not limited to memory cards or disk drives as may be appropriate in the case of downloaded services. Such devices 130 may include standard hardware computing components such as, but not limited to network and media interfaces, non-transitory computer-readable storage (memory), and processors for executing instructions that may be stored in memory. These user devices 130 may also run using a variety of different operating systems (e.g., iOS, Android), applications or computing languages (e.g., C++, JavaScript). An example user device 130 is described in detail herein with respect to FIG. 5.

The databases 140 may be stored on the platform server 120, the interactive content source servers 110, any of the servers, on the same server, on different servers, on a single server, across different servers, or on any of the user devices 130. Such databases 140 may store the streaming media and/or an associated set of object data. Such streaming media may depict one or more objects (e.g., activities) that a user can participate in and/or UGC (e.g., screen shots, videos, commentary, mashups, etc.) created by peers, publishers of the media content titles and/or third party publishers. Such UGC may include metadata by which to search for such UGC. Such UGC may also include information about the media and/or peer. Such peer information may be derived from data gathered during peer interaction with an object of an interactive content title (e.g., a video game, interactive book, etc.) and may be "bound" to and stored with the UGC. Such binding enhances UGC as the UGC may deep link (e.g., directly launch) to an object, may provide for information about an object and/or a peer of the UGC, and/or may allow a user to interact with the UGC. One or more user profiles may also be stored in the databases 140. Each user profile may include information about the user (e.g., user progress in an activity and/or media content title, user id, user game avatars, etc.) and may be associated to media.

Databases 140 may further store information regarding users (e.g., in user profiles), including one or more media sources and media titles owned, subscribed to, or otherwise available to the user. Curated tour server 125 may therefore retrieve such data from the user database and compile a list of available virtual environments associated with such media sources and titles in conjunction with virtual environment database 160. In some embodiments, the user of user device 130 may be able to request a set of virtual environments that are available across a group of users identified as potential tour participants.

A list of available virtual environments may be provided to user device 130 for selection and curation of the selected virtual environments. For example, a user of user device 130 may select a set of the virtual environments (from the same or different sources), specify an order in which the virtual environments are to be visited during the virtual tour, and further specify supplemental data or media regarding each virtual environment. Such supplemental data or media may be presented using any combination of overlays, annotations, audio-visuals, pop-up windows, or otherwise incorporated into the display of the current virtual environment. Such supplemental data and media may provide additional context by which to appreciate the current virtual environment, including pre-selected historical details, notable events, back story, navigation tips, local color regarding characters, creatures, and objects, and other type of data and media associated with the virtual environment. The user curating the tour may select from among predetermined data and media files to include in the tour, as well as record new content to present during the tour. Such tour data may be stored in curated tour database 155 for use in actually conducting the virtual tour, providing for repeat tours, and as a template for new and modified curated tours.

Curated tour server 125 may thereafter implement the tour, which may automatically launch a first virtual environment location on the tour and transport all tour participants to that first location. There, the curator (by way of an avatar) may provide live commentary and conversation in coordination with presentation of the supplemental data and media. The curator may also trigger automatic launch and virtual transport of the tour group to a second location on the tour, where any combination of live and predetermined content may be presented by the curator, and after which the tour may proceed to yet another location as selected by the curator.

Figure 2:
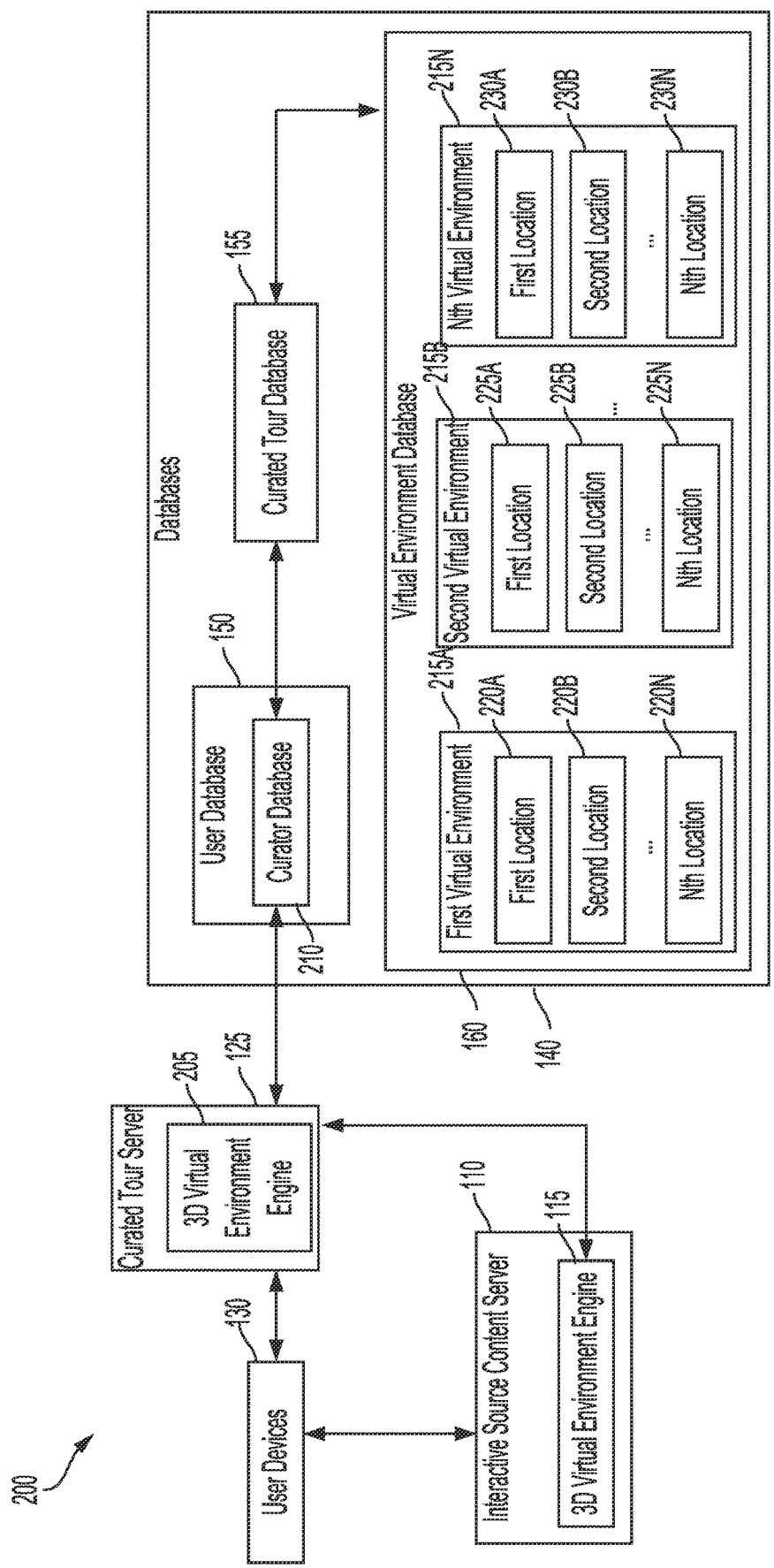
FIG. 2 illustrates a block diagram of an exemplary curated tour server for creating a customizable curated tour of three-dimensional virtual environments.

FIG. 2 illustrates a block diagram 200 of an exemplary curated tour server for creating a customizable curated tour of three-dimensional virtual environments. In an exemplary embodiment, a user device 130 associated with a curator may send a curation input that selects a three-dimensional virtual environment for a curated tour. The user device 130 may further select one or more locations within the three-dimensional virtual environment for the ordered set of locations. The selected three-dimensional virtual environment may be associated with an interactive source content server 110 or may be rendered internally based on a three-dimensional virtual environment engine 205.

For either example, the curated tour server 125 may query a curator database 210, which may be in or associated to a user database 150. The curator database 210 may link user accounts to stored curated tours created by an associated user account. The stored curated tours may be stored in a curated tour database 155. The curated tour database 155 may link to or copy datasets stored in the virtual environment database 160.

The virtual environment database 160 may store datasets associated with virtual environments, such as a first virtual environment 215A, a second virtual environment 215B, a nth virtual environment 215N. These virtual environments may be associated with interactive source content servers 110 or may be internally stored virtual environments, that includes datasets for rendering the three-dimensional virtual environment. For each of the virtual environments, locations and associated coordinates within each of the virtual environments may be stored as well. For example, the first virtual environment 215A may include a first location 220A, a second location 220B, . . . up to an Nth location 220N, a second virtual environment 215B may include a first location 225A, a second location 225B, . . . up to an Nth location 225N, a nth virtual environment 215N may include a first location 230A, a second location 230B, . . . up to an Nth location 230N. The virtual environment database 160 may include, not only information pertaining to coordinates of each of the locations, but also curated user-generated content that is conveyed during the curated tour.

The user-generated content may be generated by user devices 130 associated with user accounts associated with the platform servers 120 and/or interactive content source accounts that provide generated content for the curated tour that's provided by producers of interactive content title that take advantage of the curated tour server 125 and provide more bonus content associated with the three-dimensional virtual environment in the form of a curated tour. User accounts associated with the platform servers 120 may also create curated tours, such as for friend accounts or as a public curated tour, of various locations in virtual environments sourced from interactive content source servers 110 or from three-dimensional virtual environments rendered by the platform servers 120, such as via the three-dimensional virtual environment engine 205 associated with the curated tour server 125.

The three-dimensional virtual environment may correspond to a real-world location. For example, the first virtual environment 215A may be associated with a particular college. The first location 220A may be associated with a historical monument, the second location 220B may be associated with its oldest building, etc. The datasets associated with these locations may include information regarding interesting facts. The datasets may also correspond to a plurality of different time periods with respect to the three-dimensional virtual environment. In this example, the three-dimensional virtual environment may provide renderings associated with these locations set in different time periods and further provide historical facts.

In the three-dimensional virtual environment, a feature discovery mode may be added as part of the curated tour. The avatars may be given an option to explore the three-dimensional virtual environment and locations of the avatars may be monitors. When an avatar is within a predetermined proximity of a location that is part of the set of selected locations of the curated tour, an option may be presented to the avatar. The option may be to learn more about that location, to change the time period to view the same location, to play a game/quiz associated with the location, or other activities that may include a custom selection of data from the dataset, modified data, and/or new curation data to add the data set.

As mentioned above, the three-dimensional virtual environment may also correspond to an in-game environment of an interactive content title that is maintained, streamed, and/or hosted by an associated interactive source content server 110 that renders the associated three-dimensional virtual environment with an associated three-dimensional virtual environment engine 115.

Figure 3A:
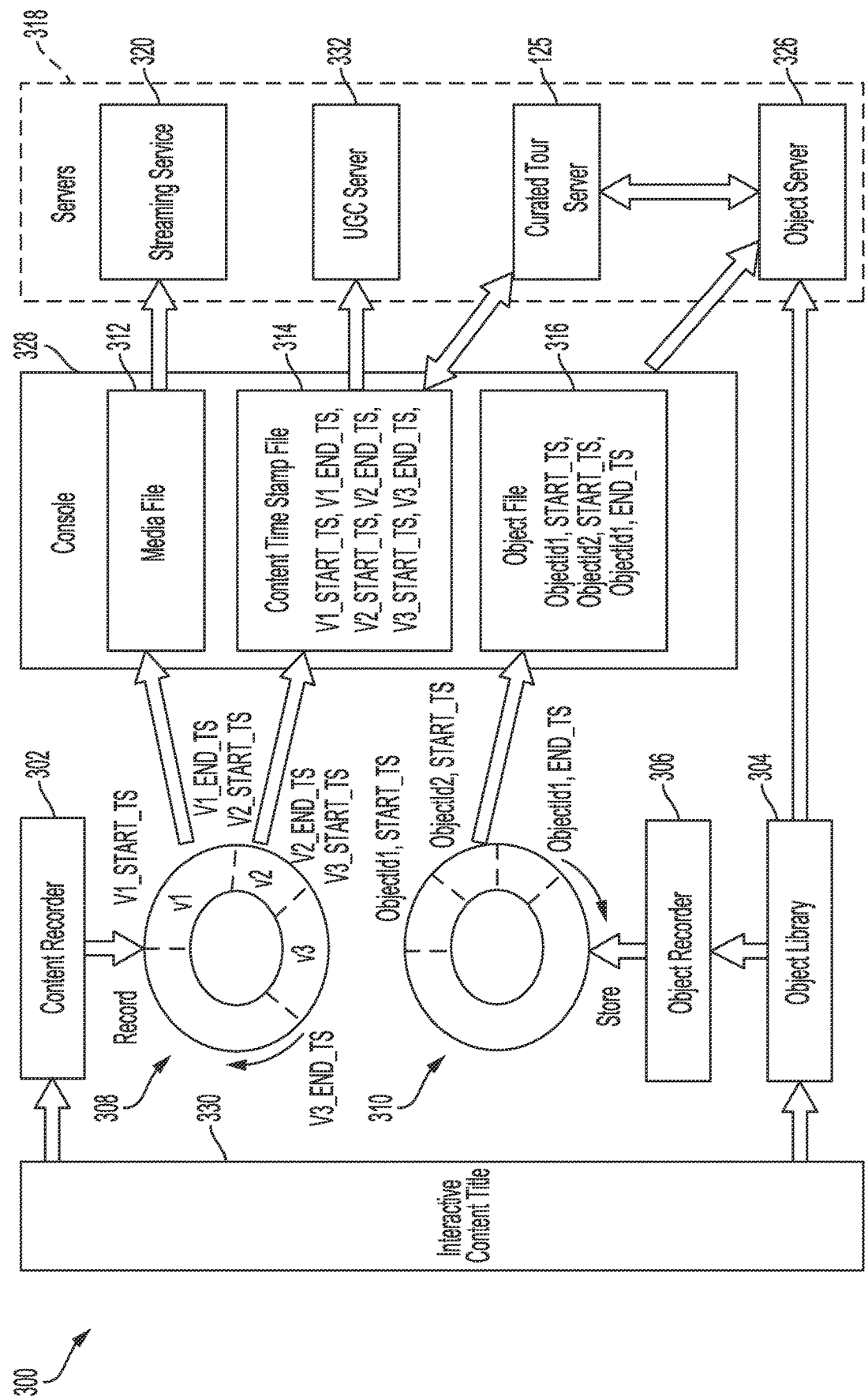
FIG. 3A illustrates a universal data system that provides data used to create a customizable curated tour of three-dimensional virtual environments.

In the example universal data system 300 of FIG. 3A, an example console 328 (e.g., a user device 130) and example servers 318 (e.g., streaming server 320, activity feed server 324, UGC server 332, and an object server 326) are shown. The universal data system 300 may record media files 312 and activity data, stored in object files 316, that may be selected and used as part of a curated tour. For example, recorded objects files 316 may be retrieved by the curated tour sever 125 for determining the virtual environments saved in the virtual environment database 160.

The console 328 may be implemented on the platform server 120, a cloud server, or on any of the servers 318. The console 328 may further includes a content recorder 302 and an object recorder 306, described in more detail below, where content (e.g., media) may be recorded and outputted through the console 328. The interactive various content titles 330 may be executed on the console 328. Alternatively or in addition to, the content recorder 302 may be implemented on the platform server 120, a cloud server, or on any of the servers 318. Such content recorder 302 may receive and record content (e.g., media) from an interactive content title 330 (e.g., interactive content source servers 110) onto a content ring-buffer 308. Such ring-buffer 308 may store multiple content segments (e.g., v1, v2 and v3), start times for each segment (e.g., V1_START_TS, V2_START_TS, V3_START_TS), and end times for each segment (e.g., V1_END_TS, V2_END_TS, V3_END_TS). Such segments may be stored as a media file 312 (e.g., MP4, WebM, etc.) by the console 328. Such media file 312 (e.g., a portion of the streaming media) may be uploaded to the streaming server 320 for storage and subsequent streaming or use, though the media file 312 may be stored on any server, a cloud server, any console 328, or any user device 130. The media file 312 may be uploaded periodically and/or in real-time or close to real-time. Such start times and end times for each segment may be stored as a content time stamp file 314 by the console 328. Such content time stamp file 314 may also include a streaming ID, which matches a streaming ID of the media file 312, thereby associating the content time stamp file 314 to the media file 312. Such content time stamp file 314 may be uploaded and stored to the activity feed server 324 and/or the UGC server 332, though the content time stamp file 314 may be stored on any server, a cloud server, any console 328, or any user device 130.

Concurrent to the content recorder 302 receiving and recording content from the interactive content title 330, an object library 304 receives object data from the interactive content title 330, and an object recorder 306 tracks the object data to determine when an object beings and ends. Such object data may be uploaded periodically and/or in real-time or close to real-time. The object library 304 and the object recorder 306 may be implemented on the platform server 120, a cloud server, or on any of the servers 318. When the object recorder 306 detects an object beginning, the object recorder 306 receives object data (e.g., if the object were an activity, user interaction with the activity, activity ID, activity start times, activity end times, activity results, activity types, etc.) from the object library 304 and records the activity data onto an object ring-buffer 310 (e.g., ActivityID1, START_TS; ActivityID2, START_TS; ActivityID3, START_TS). Such activity data recorded onto the object ring-buffer 310 may be stored in an object file 316. Such object file 316 may also include activity start times, activity end times, an activity ID, activity results, activity types (e.g., competitive match, quest, task, etc.), user or peer data related to the activity. For example, an object file 316 may store data regarding an item used during the activity. Such object file 316 may be stored on the object server 326, though the object file 316 may be stored on any server, a cloud server, any console 328, or any user device 130.

Such object data (e.g., the object file 316) may be associated with the content data (e.g., the media file 312 and/or the content time stamp file 314). In one example, the object server 326 stores and associates the content time stamp file 314 with the object file 316 based on a match between the streaming ID of the content time stamp file 314 and a corresponding activity ID of the object file 316. In another example, the object server 326 may store the object file 316 and may receive a query from the UGC server 332 for the object file 316. Such query may be executed by searching for an activity ID of the object file 316 that matches a streaming ID of a content time stamp file 314 transmitted with the query. In yet another example, a query of stored content time stamp files 314 may be executed by matching a start time and end time of a content time stamp file 314 with a start time and end time of a corresponding object file 316 transmitted with the query. Such object file 316 may also be associated with the matched content time stamp file 314 by the UGC server 332, though the association may be performed by any server, a cloud server, any console 328, or any user device 130. In another example, an object file 316 and a content time stamp file 314 may be associated by the console 328 during creation of each file 314, 316.

Figure 3B:
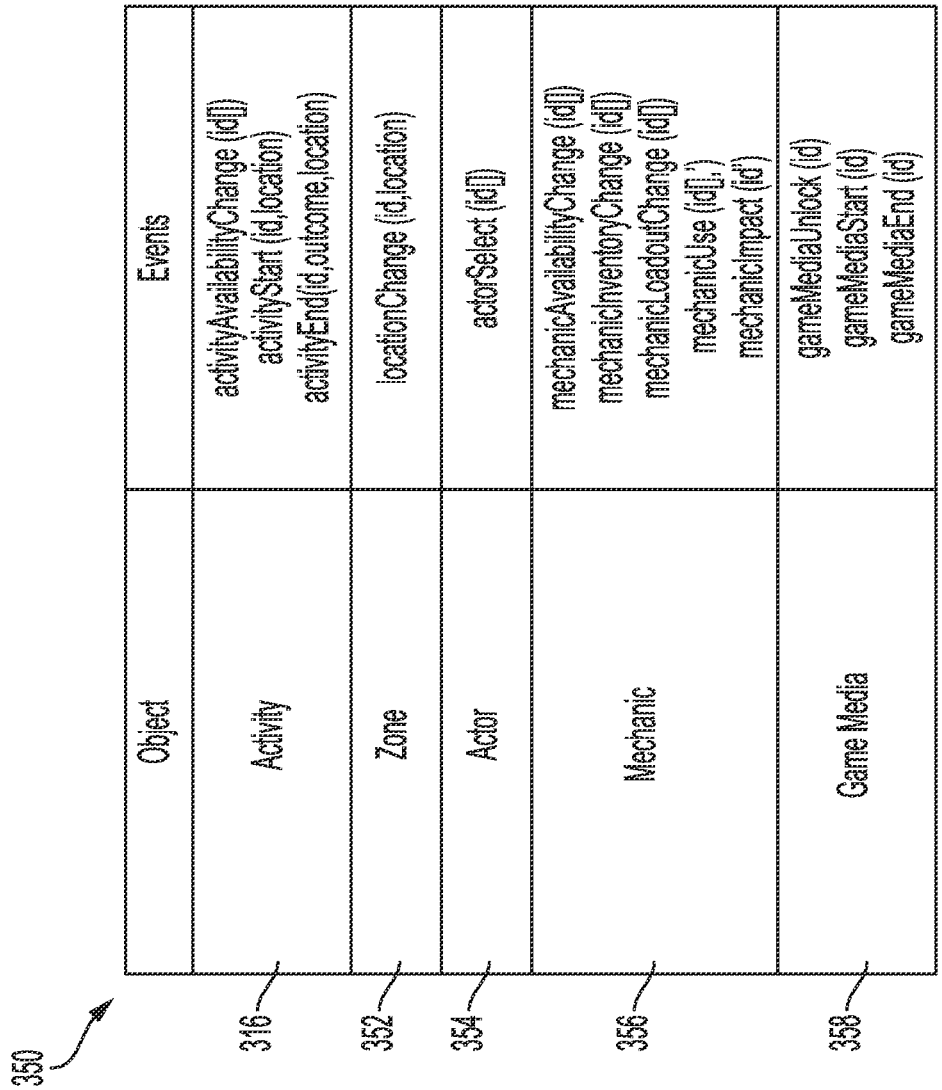
FIG. 3B illustrates an exemplary table of various objects and associated events, according to an aspect of the present disclosure.

As shown in the example table 350 of FIG. 3B, such object data (e.g., the object file 316) may be associated with event information regarding activity availability change and may be related to other objects with associated object information. Media-object bindings may form telemetry between the objects shown in at least a portion of the streaming media and the streaming media. For example, such object data may be zone data files 352, actor data files 354, mechanics data files 356, game media data files 358, and other gameplay-related data files.

Such object data (e.g., the object file 316) may be categorized as in in progress, open-ended, or competitive. Such object data may include optional properties, such as a longer description of the activity, an image associated with the activity, if the activity is available to players before launching the game, whether completion of the activity is required to complete the game, whether the activity can be played repeatedly in the game, and whether there are nested tasks or associated child activities. Such object data may include an activity availability change event for, which may indicate a list or array of currently available activities for the player. For example, this may be used to decide what activities to display in a game plan.

Such zone data files 352 may indicate an area of an associated game world with a single coordinate system wherein the zone may have a 2-D map associated with it, and may be used to display locations on the zone. If zone data files 352 are applicable, each zone may include a zone ID and a short localizable name of the Zone. Such zone data files 352 may be associated with a view projection matrix (4×4) to convert from 3-D world coordinates to a 2-D map position. Such zone data files 352 may be associated with a location change event that indicates an update to a current in-game location of the player. Such location change event may be posted regularly, or whenever the player's in-game location changes significantly. The platform server 120 may store a latest value in 'state.' Such zone data files 352 may include an x, y, z position of the player's character in the zone as well as an a, b, c vector indicating the player's characters orientation or direction. Such zone data files 352 may be associate with an activity start event and/or an activity end event and for the activity end event, an outcome of completed, failed, or abandoned may be associated to the activity (e.g., activity ID).

Such actor data files 354 may be associated with an entity with behaviors in the game, and can be player-controller or game-controlled, and can change dynamically during gameplay. Such actor data files 354 may include an actor ID for the actor, a localizable name for the actor, an image of the actor, and/or a short description of the actor. Such actor data files 354 may be associated with an actor select event that indicates that the player's selected actor(s) have changed. The selected actor(s) may represent the actors the player is controlling in the game and may be displayed on the player's profile and other spaces via the platform server 120. There may be more than one actor selected at time and each game may replace its list of actors upon loading save data.

Such mechanics data files 356 may be associated with an item, skill, or effect that can be used by the player or the game to impact gameplay (e.g., bow, arrow, stealth attack, fire damage) and may exclude items that do no impact gameplay (e.g., collectibles). Such mechanics data files 356 may include a mechanic ID of the mechanic, a short name of the mechanic, an image of the mechanic, and/or a short description of the mechanic. Such mechanics data files 356 may be associated with a mechanic availability change event that indicates that the mechanics available to the player have changed. Available may mean that the mechanic is available in the game world for the player to use, but may require the player to go through some steps to acquire it into inventory (e.g., buy from a shop, pick up from the world) before using it. Each game may replace its list of mechanics upon loading save data.

Such mechanics data files 356 may be associated with a mechanic inventory change event that indicates that the player's inventory has changed. Inventory may refer to mechanics that are immediately usable to the player without having to take additional steps in the game before using it. Inventory information is used to estimate a player's readiness for various activities, which may be forwarded to the platform server 120. Games may replace its list of mechanic inventory upon loading save data. Mechanics on cool down may be considered part of the inventory. Mechanic counts (e.g., ammunition, healing points) with any non-zero value may be treated as "in inventory." Inventory mechanics may be considered a subset of available mechanics.

Such mechanics data files 356 may be associated with a mechanic use event that indicates that a mechanic has been used by or against the player and may be used to be displayed as mechanic usage in a UGC context. Such mechanics data files 356 may include a list or array of mechanics that were used (e.g., fire arrow, fire damage) or whether an initiator is the player, such that whether the mechanics were used by or against the player. Such mechanics data files 356 may include an initiator actor ID, a current zone ID of the initiator actor, and/or a current x, y, z position of the initiator actor. Such mechanics data files 356 may be associated with a mechanic impact event that indicates that a mechanic had impact on gameplay (e.g., an arrow hit an enemy) and may be used to display mechanic image in a UGC context. Mechanic use and mechanic image events may be not linked. Such mechanics data files 356 may include the initiator action ID, the current zone ID of the initiator actor, the current x, y, z position of the initiator actor, a target actor ID, a current zone ID of the target actor, a current x, y, z of the target actor, and a mitigation mechanic that may mitigate the initiator mechanic.

Such game media data files 358 may be include a game media ID of the game media, a localizable name for the game media, a media format (e.g., image, audio, video, text, etc.), a category or type of media (cut-scene, audiolog, poster, developer commentary, etc.), a URL or a server-provisioned media file, and/or whether the game media is associated with a particular activity. Such game media data files 358 may be associated with a game media start event that indicates that a particular piece of game media has started in the game right now and a game media end event that indicates that the particular piece of game media has ended.

Figure 4:
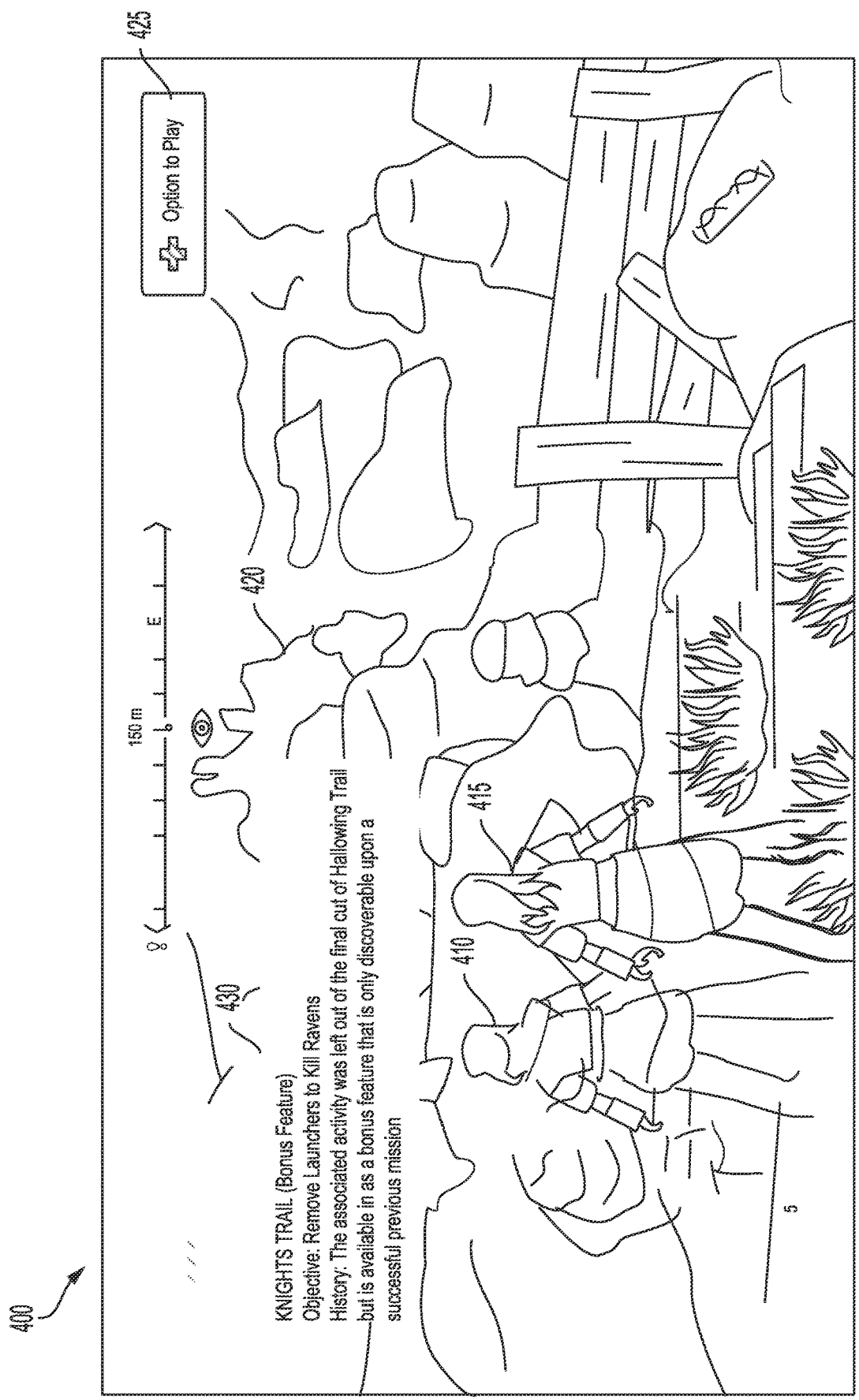
FIG. 4 illustrates an exemplary graphical user interface in which designated avatars are engaged in a curated tour in a three-dimensional virtual environment.

FIG. 4 illustrated an exemplary graphical user interface 400 in which designated avatars are engaged in a curated tour in a three-dimensional virtual environment. In particular, the exemplary graphical user interface 400 displays a three-dimensional virtual environment that is associated with an interactive content title.

Avatars that are associated with user accounts that have selected to experience the curated tour, such as avatars 410, 415 in FIG. 4, may be guided through the curated tour of the three-dimensional virtual environment of the interactive content title. For example, the guided avatars may be led via signs to move through three-dimensional virtual environment from the first selection location to the next selection location or may be teleported to the next location. As shown in FIG. 4, a next location 420 is shown to be 150 m forward, and the avatars 410, 415 can travel through the three-dimensional virtual environment to reach the next location 420. As the avatars 410, 415 are traveling to the next location, or once they arrive at the next location, the user devices associated with each avatar 410, 415 may receive and display user-generated content 430 associated with the next location 420. For example, FIG. 4 shows that the avatars 410, 415 are headed towards the Knights Trail, which is a bonus feature of the interactive content title. The user-generated content 430 further indicates what the objective is at the Knights Trail and a history tidbit, that the associated activity was left out of the final cut of the associated interactive content title, the Hallowing Trail, but is available as a bonus feature that is only discoverable upon a successful previous mission. The user devices may also be provided an option to play 425 the associated activity that may directly launch the associated activity with or without the other user accounts on the curated tour.

Figure 5:
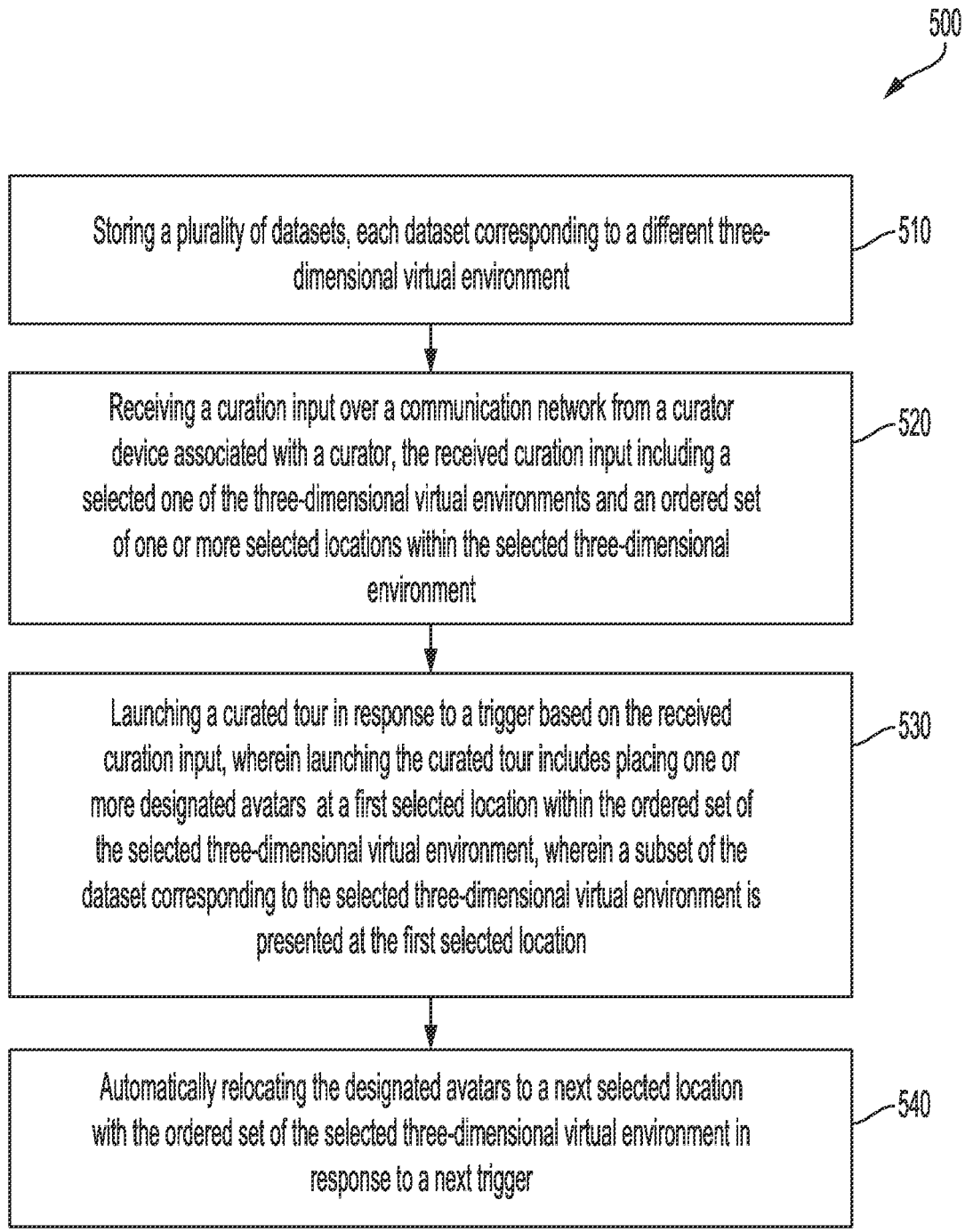
FIG. 5 is a flowchart of a method for creating a customizable curated tour of three-dimensional virtual environments.

FIG. 5 illustrates an example method 500 for summary. Although the example method 500 depicts a particular sequence of operations, the sequence may be altered without departing from the scope of the present disclosure. For example, some of the operations depicted may be performed in parallel or in a different sequence that does not materially affect the function of the method 500. In other examples, different components of an example device or system that implements the method 500 may perform functions at substantially the same time or in a specific sequence.

According to some examples, the method includes storing a plurality of datasets, each dataset corresponding to a different three-dimensional virtual environment at step 510. For example, the virtual environment database 160 illustrated in FIGS. 1 and 2 may store a plurality of datasets, each dataset corresponding to a different three-dimensional virtual environment.

According to some examples, the method includes receiving a curation input over a communication network from a curator device associated with a curator, the received curation input including a selected one of the three-dimensional virtual environments and an ordered set of one or more selected locations within the selected three-dimensional environment at step 520. For example, the curated tour server 125 illustrated in FIGS. 1 and 2 may receive a curation input over a communication network from a curator device associated with a curator, the received curation input including a selected one of the three-dimensional virtual environments and an ordered set of one or more selected locations within the selected three-dimensional environment.

According to some examples, the method includes launching a curated tour in response to a trigger based on the received curation input at step 530. For example, the curated tour server 125 illustrated in FIGS. 1 and 2 may launch a curated tour in response to a trigger based on the received curation input. In some examples, launching the curated tour includes placing one or more designated avatars at a first selected location within the ordered set of the selected three-dimensional virtual environment. In some examples, a subset of the dataset corresponding to the selected three-dimensional virtual environment is presented at the first selected location.

According to some examples, the method includes automatically relocating the designated avatars to a next selected location with the ordered set of the selected three-dimensional virtual environment in response to a next trigger at step 540. For example, the curated tour server 125 illustrated in FIGS. 1 and 2 may automatically relocate the designated avatars to a next selected location with the ordered set of the selected three-dimensional virtual environment in response to a next trigger.

According to some examples, the method includes storing the curation input in memory. For example, the curated tour server 125 illustrated in FIGS. 1 and 2 may store the curation input in memory. In some examples, the curation input is stored in association with a feature discovery mode.

According to some examples, the method includes monitoring locations of one or more avatars in the selected three-dimensional environment. For example, the curated tour server 125 illustrated in FIGS. 1 and 2 may monitor locations of one or more avatars in the selected three-dimensional environment. In some examples, the monitored avatars are associated with the feature discovery mode. In some examples, the selected three-dimensional virtual environment corresponds to a real-world location. In some examples, the dataset corresponding to the selected three-dimensional virtual environment includes content regarding the real-world location throughout a plurality of different time periods. In some examples, the selected three-dimensional virtual environment corresponds to an in-game environment of an interactive content title. In some examples, the dataset corresponding to the selected three-dimensional virtual environment includes content regarding one or more in-game features of the in-game environment.

According to some examples, the method includes providing an option to present the subset of the dataset corresponding to the selected three-dimensional environment when an avatar is within a predetermined proximity to the first selected location. For example, the curated tour server 125 illustrated in FIGS. 1 and 2 may provide an option to present the subset of the dataset corresponding to the selected three-dimensional environment when an avatar is within a predetermined proximity to the first selected location. In some examples, the subset includes user-generated content regarding one or more in-game activities in which one or more other users participated in at the first selected location. In some examples, the curation input further includes custom data to include in the subset. In some examples, the custom data includes at least one of custom selections of data from the dataset, modified data from the dataset, and new curation data to add to the dataset.

According to some examples, the method includes providing an option to launch a game between the one or more avatars during the curated tour. For example, the curated tour server 125 illustrated in FIGS. 1 and 2 may provide an option to launch a game between the one or more avatars during the curated tour.

Figure 6:
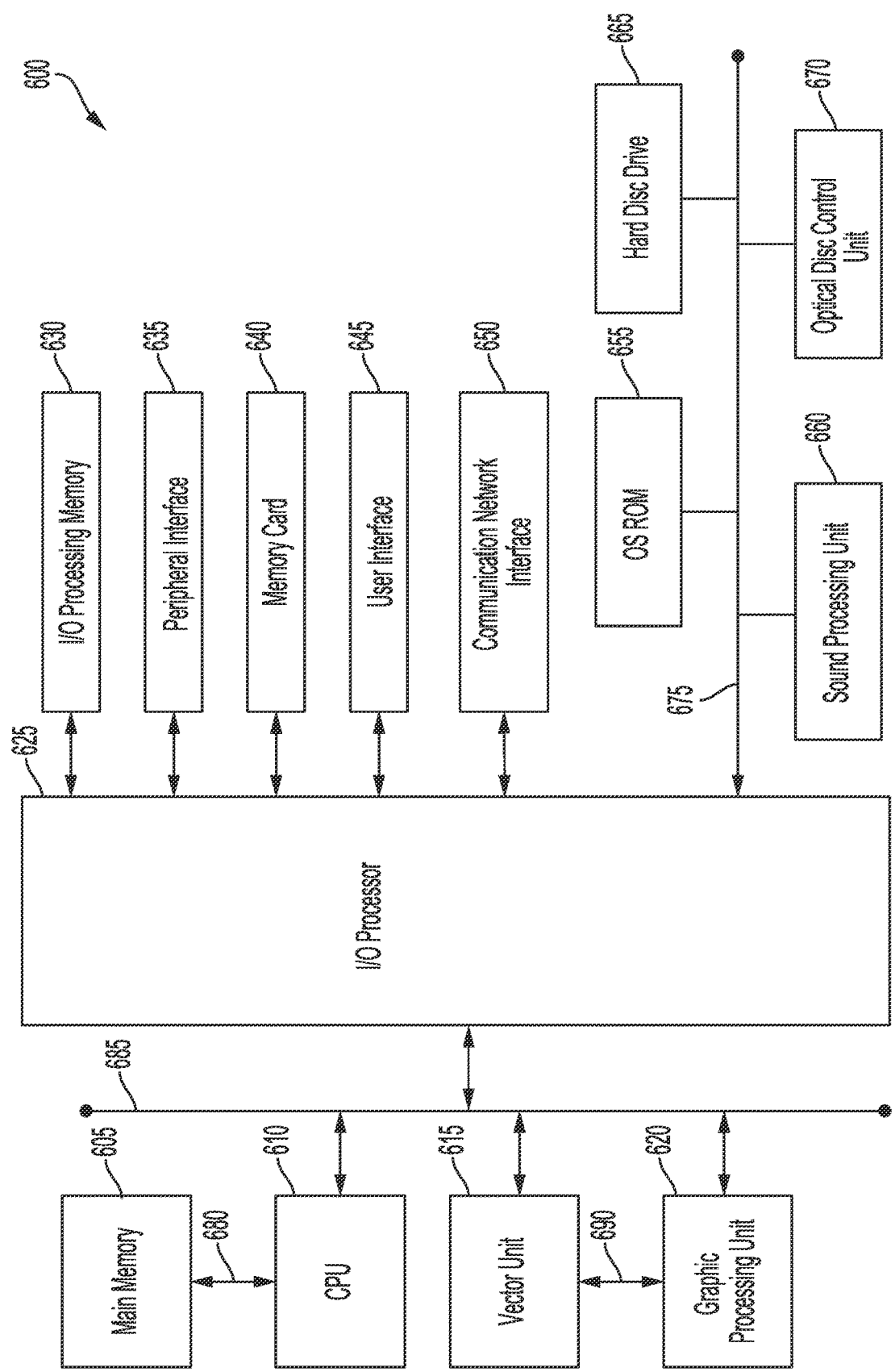
FIG. 6 is a block diagram of an exemplary electronic entertainment system that may be used in embodiments of the present invention.

FIG. 6 is an example user electronic entertainment system that may be used in launching interactive content and providing dynamic interfaces, according to an aspect of the present disclosure. The entertainment system 600 of FIG. 6 includes a main memory 605, a central processing unit (CPU) 610, vector unit 615, a graphics processing unit 620, an input/output (I/O) processor 625, an I/O processor memory 630, a peripheral interface 635, a memory card 640, a Universal Serial Bus (USB) interface 645, and a communication network interface 650. The entertainment system 600 further includes an operating system read-only memory (OS ROM) 655, a sound processing unit 660, an optical disc control unit 670, and a hard disc drive 665, which are connected via a bus 675 to the I/O processor 625.

Entertainment system 600 may be an electronic game console. Alternatively, the entertainment system 600 may be implemented as a general-purpose computer, a set-top box, a hand-held game device, a tablet computing device, a virtual reality device, an augmented reality device, or a mobile computing device or phone. Entertainment systems may contain more or less operating components depending on a particular form factor, purpose, or design.

The CPU 610, the vector unit 615, the graphics processing unit 620, and the I/O processor 625 of FIG. 6 communicate via a system bus 685. Further, the CPU 610 of FIG. 6 communicates with the main memory 605 via a dedicated bus 680, while the vector unit 615 and the graphics processing unit 620 may communicate through a dedicated bus 690. The CPU 610 of FIG. 6 executes programs stored in the OS ROM 655 and the main memory 605. The main memory 605 of FIG. 6 may contain pre-stored programs and programs transferred through the I/O Processor 625 from a CD-ROM, DVD-ROM, or other optical disc (not shown) using the optical disc control unit 670. I/O Processor 625 of FIG. 6 may also allow for the introduction of content transferred over a wireless or other communications network (e.g., 4G, LTE, 1G, and so forth). The I/O processor 625 of FIG. 6 primarily controls data exchanges between the various devices of the entertainment system 600 including the CPU 610, the vector unit 615, the graphics processing unit 620, and the peripheral interface 635.

The graphics processing unit 620 of FIG. 6 executes graphics instructions received from the CPU 610 and the vector unit 615 to produce images for display on a display device (not shown). For example, the vector unit 615 of FIG. 6 may transform objects from three-dimensional coordinates to two-dimensional coordinates, and send the two-dimensional coordinates to the graphics processing unit 620. Furthermore, the sound processing unit 660 executes instructions to produce sound signals that are outputted to an audio device such as speakers (not shown). Other devices may be connected to the entertainment system 600 via the USB interface 645, and the communication network interface 650 such as wireless transceivers, which may also be embedded in the system 600 or as a part of some other component such as a processor.

A user of the entertainment system 600 of FIG. 6 provides instructions via the peripheral interface 635 to the CPU 610, which allows for use of a variety of different available peripheral devices (e.g., controllers) known in the art. For example, the user may instruct the CPU 610 to store certain game information on the memory card 640 or other non-transitory computer-readable storage media or instruct an avatar in a game to perform some specified action.

The present disclosure pertains to an application that may be operable by a variety of end user devices. For example, an end user device may be a personal computer, a home entertainment system (e.g., Sony PlayStation2® or Sony PlayStation3® or Sony PlayStation4® or Sony PlayStation5®), a portable gaming device (e.g., Sony PSP® or Sony Vita®), or a home entertainment system of a different albeit inferior manufacturer. The present methodologies described herein are fully intended to be operable on a variety of devices. Aspects of the present disclosure may also be implemented with cross-title neutrality and/or may be utilized across a variety of titles from various publishers.

Aspects of the present disclosure may be implemented in an application that may be operable using a variety of devices. Non-transitory computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of non-transitory computer-readable media include, for example, a floppy disk, a flexible disk, a hard disk, magnetic tape, any other magnetic medium, a CD-ROM disk, digital video disk (DVD), any other optical medium, RAM, PROM, EPROM, a FLASHEPROM, and any other memory chip or cartridge.

Various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU. Various forms of storage may likewise be implemented as well as other network interfaces and network topologies to implement the same.

In some aspects of the present disclosure, computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

What is claimed is:

1. A method for providing curated virtual tours in three-dimensional (3D) virtual environments, the method comprising:
    storing a plurality of datasets, each dataset corresponding to a different three-dimensional virtual environment;
    receiving a curation input over a communication network from a curator device, the received curation input including a selected one of the three-dimensional virtual environments and a specified order for an ordered set of one or more selected virtual locations within the selected three-dimensional virtual environment;
    launching a curated tour session for a plurality of user devices in response to a trigger based on the received curation input, wherein launching the curated tour session includes placing a group of one or more designated avatars corresponding to the user devices at a first virtual location in accordance with the specified order for the ordered set of the selected three-dimensional virtual environment, wherein a subset of the dataset corresponding to the selected three-dimensional virtual environment is presented at the first virtual location; and
    automatically relocating the group of designated avatars to a next virtual location in accordance with the specified order for the ordered set of the locations within the selected three-dimensional virtual environment in response to a next trigger.

2. The method of claim 1, wherein the first virtual location of the selected three-dimensional virtual environment corresponds to a real-world location, wherein the dataset corresponding to the first virtual location of the selected three-dimensional virtual environment includes content regarding the real-world location throughout a plurality of different time periods.

3. The method of claim 1, wherein the first virtual location of the selected three-dimensional virtual environment corresponds to an in-game environment of an interactive content title, and wherein the dataset corresponding to the selected three-dimensional virtual environment includes content regarding one or more in-game features of the in-game environment.

4. The method of claim 1, further comprising:
storing the curation input in memory, wherein the curation input is stored in association with a feature discovery mode;
monitoring virtual locations of one or more avatars in the selected three-dimensional virtual environment, wherein the monitored avatars are associated with the feature discovery mode; and
providing an option to present the subset of the dataset corresponding to the selected three-dimensional virtual environment when an avatar is within a predetermined proximity to the first virtual location.

5. The method of claim 4, wherein the subset includes user-generated content regarding one or more in-game activities in which one or more other users participated in at the first virtual location.

6. The method of claim 1, wherein the curation input further includes custom data to include in the subset, and wherein the custom data includes at least one of custom selections of data from the dataset, modified data from the dataset, and new curation data to add to the dataset.

7. The method of claim 1, further comprising providing an option to launch a game between the one or more avatars during the curated tour session.

8. The method of claim 4, wherein the options include an option to engage with a virtual activity associated with the first virtual location.

9. The method of claim 1, wherein the curation input further identifies supplemental data or media associated with the first virtual location, and updating a display of the first virtual location to present the supplemental data or media in response to the curation input.

10. The method of claim 9, further comprising presenting live content or commentary in coordination with the subset of the dataset presented at the first virtual location.

11. The method of claim 9, wherein the curation input selects the supplemental data or media from a plurality of predetermined files.

12. The method of claim 9, further comprising recording new content provided by the curator device, wherein the new content is identified as the supplemental data or media by the curation input.

13. A system for providing curated virtual tours in three-dimensional (3D) virtual environments, the system comprising:
memory that stores a plurality of datasets, each dataset corresponding to a different three-dimensional virtual environment;
a communication interface that communicates over a communication network, wherein the communication interface receives a curation input over a communication network from a curator device, the received curation input including a selected one of the three-dimensional virtual environments and a specified order for an ordered set of one or more selected virtual locations within the selected three-dimensional virtual environment; and
a processor configured to execute instructions, wherein the processor executes the instructions to:
launch a curated tour session for a plurality of user devices in response to a trigger based on the received curation input, wherein launching the curated tour session includes placing a group of one or more designated avatars corresponding to the user devices at a first virtual location in accordance with the specified order for the ordered set of the selected three-dimensional virtual environment, wherein a subset of the dataset corresponding to the selected three-dimensional virtual environment is presented at the first virtual location, and
automatically relocate the group of designated avatars to a next virtual location in accordance with the specified order for the ordered set of the locations within the selected three-dimensional virtual environment in response to a next trigger.

14. The system of claim 13, wherein the first virtual location of the selected three-dimensional virtual environment corresponds to a real-world location, and wherein the dataset corresponding to the first virtual location of the selected three-dimensional virtual environment includes content regarding the real-world location throughout a plurality of different time periods.

15. The system of claim 13, wherein the selected three-dimensional virtual environment corresponds to an in-game environment of an interactive content title.

16. The system of claim 13, wherein the memory further stores the curation input, wherein the curation input is stored in association with a feature discovery mode, and wherein the processor executes further instructions to:
monitor virtual locations of one or more avatars in the selected three-dimensional virtual environment, wherein the monitored avatars are associated with the feature discovery mode; and
provide an option to present the subset of the dataset corresponding to the selected three-dimensional virtual environment when an avatar is within a predetermined proximity to the first virtual location.

17. The system of claim 16, wherein the subset includes user-generated content regarding one or more in-game activities in which one or more other users participated in at the first virtual location.

18. The system of claim 13, wherein the curation input further includes custom data to include in the subset.

19. The system of claim 13, wherein the processor executes further instructions to provide an option to launch a game between the one or more avatars during the curated tour session.

20. A non-transitory, computer-readable storage medium comprising instructions executable by a computing system to perform a method for providing curated virtual tours in three-dimensional (3D) virtual environments, the method comprising:
storing a plurality of datasets, each dataset corresponding to a different three-dimensional virtual environment;
receiving a curation input over a communication network from a curator device, the received curation input including a selected one of the three-dimensional virtual environments and a specified order for an ordered set of one or more virtual locations within the selected three-dimensional virtual environment;
launching a curated tour session for a plurality of user devices in response to a trigger based on the received curation input, wherein launching the curated tour session includes placing a group of one or more designated avatars corresponding to the user devices at a first virtual location in accordance with the specified order for the ordered set of the selected three-dimensional virtual environment, wherein a subset of the dataset corresponding to the selected three-dimensional virtual environment is presented at the first virtual location; and automatically relocating the group of designated avatars to a next virtual location in accordance with the specified order for the ordered set of the locations within the selected three-dimensional virtual environment in response to a next trigger.

\* \* \* \* \*